United States Patent [19]
Shelton

[11] 3,840,993
[45] Oct. 15, 1974

[54] COORDINATE MEASURING MACHINE
[75] Inventor: Russell S. Shelton, Paducah, Ky.
[73] Assignee: Shelton Metrology Laboratory, Inc., Tyler Park, Paducah, Ky.
[22] Filed: Apr. 25, 1969
[21] Appl. No.: 819,252

[52] U.S. Cl............. 33/1 M, 33/125 M, 33/172 R, 33/189, 188/176
[51] Int. Cl. ............................................ G01b 5/00
[58] Field of Search..... 33/174 A, 1 M, 189, 174 L, 33/174 P, 174 PA, 174 PR, 199 CE, 125 R, 141 A, DIG. 2, 172 A, 147 A; 308/9 CE, 5; 188/176

[56] References Cited
UNITED STATES PATENTS

| | | | |
|---|---|---|---|
| 2,410,877 | 11/1946 | Hall | 33/174 H |
| 2,601,630 | 6/1952 | Rahn | 33/174 H |
| 2,618,860 | 11/1952 | Engelhart | 33/189 |
| 3,001,609 | 9/1961 | Macks | 308/DIG. 1 |
| 3,104,496 | 9/1963 | Macks | 308/DIG. 1 |
| 3,237,312 | 3/1966 | Boppel | 33/199 |
| 3,239,939 | 3/1966 | Aller | 33/174 |
| 3,320,673 | 5/1967 | Larson | 33/172 |
| 3,384,970 | 5/1968 | Avalear | 33/189 |
| 3,386,174 | 6/1968 | Leach et al. | 33/174 |
| 3,438,133 | 4/1969 | Brault | 33/1 |
| 3,504,441 | 4/1970 | Linley et al. | 33/174 |
| 3,509,635 | 5/1970 | Meinke | 33/174 |
| 3,531,868 | 10/1970 | Stevenson | 33/174 P |

FOREIGN PATENTS OR APPLICATIONS
668,805  2/1966  Belgium................................. 33/1

Primary Examiner—William D. Martin, Jr.
Attorney, Agent, or Firm—Browne, Beveridge, DeGrandi & Kline

[57] ABSTRACT

A measuring machine has a probe which is movable in any of three mutually perpendicular directions. A pedestal for the probe is supported by air bearings and is guided by a guide bar which lies on a flat reference surface. An air bearing on the pedestal acts against one vertical face of the guide bar and a roller of a measuring device is resiliently biased against an opposite face of the guide bar to preload the air bearing. The pedestal includes a bridge having a pair of legs and a horizontal beam which supports a horizontally movable carriage. The probe is on a support member which is vertically movable within air bearings on the carriage. A pneumatic cylinder exerts an upward force on the vertically movable probe support member to counteract gravitational forces. Air bearings act on opposite vertical faces of the vertically movable portion of the probe support member, and means are provided for shutting off only the air bearing acting on one side thereof in order to exert a frictional braking force to hold the vertically movable support in a fixed position.

2 Claims, 5 Drawing Figures

COORDINATE MEASURING MACHINE

BACKGROUND OF THE INVENTION

This invention is directed to a coordinate measuring machine for measuring objects or for marking and laying out patterns on a workpiece. Preferably, the apparatus provides for movement of a probe in any one of three mutually perpendicular coordinate directions; however, various features of this invention may equally be applicable to measuring devices which have fewer coordinate axes.

Coordinate measuring machines are well known and are commercially available in several forms. Generally, the machines are complicated and quite expensive. Further, their accuracy is not always reliable due to distortion of their parts and the wear which results from extensive use.

One of the simpler forms of measuring apparatus in the past has involved a surface plate which is usually a block of granite or other dimensionally stable material. A workpiece and a height-measuring gauge are both placed on the surface plate and manipulated in order to measure the height of the object. This approach has the obvious inability to handle complex measurements along more than a single axis, therefore rendering it incapable of many measuring tasks.

SUMMARY

Many facets of the presently disclosed apparatus involves new and useful departures from the prior art apparatus in this field.

According to one aspect of the invention, the coordinate measuring machine includes a series of elements which may be associated with a conventional surface plate in order to provide apparatus having the ability to make highly accurate measurements. This is possible by virtue of a linear guide bar member which lies on a standard surface plate to provide a surface for guiding a probe-carrying pedestal movable therealong. A refinement of this important concept involves the use of hydrostatic bearings such as air bearings to guide and support the probe-supporting structure. The pedestal may constitute a pair of spaced apart legs which are supported by air bearings and bridged by a beam. A carriage is movable horizontally along the beam in a direction perpendicular to the linear guide member. The air bearings on the carriage which guide the probe support assembly for vertical movement are arranged so that one or more bearings on only one side thereof may be deactivated in order to provide a braking force to hold the probe support assembly at a constant elevation. A pneumatic cylinder exerts an upward force to offset at least partially the weight of the probe support assembly. Movement of the probe in each of the three coordinate directions may be measured by a gauge which has a gauging roller biased against one side of a reference member in order to preload an air bearing which rides against the opposite side of the reference member.

A principal object of the invention is to provide measuring apparatus which is uncomplicated, accurate, and readily adapted for use in conjunction with a standard prior art measuring surface plate.

Another object is to provide highly accurate linear movement by moving a gauging roller along one surface of a reference member, and concurrently advancing a hydrostatic bearing along the opposite side of the reference member.

Still another object is to provide a novel arrangement for providing an upwardly directed force on a vertically movable probe-supporting assembly.

Still another object is to provide a novel means for maintaining a vertically movable probe-supporting assembly in a fixed position by deactivating only one of an opposed pair of air bearings which guide its vertical movement.

Further objects and advantages of the invention will be apparent to those skilled in the art upon studying the following detailed description of an apparatus which incorporates the features of the invention.

DESCRIPTION OF A PREFERRED EMBODIMENT

The following description relates to a preferred embodiment of the invention which incorporates a number of advantageous features. Many of these features are separable from the particular apparatus disclosed and may be used in diverse types of measuring devices without departing from the spirit of the invention.

Figure 1:
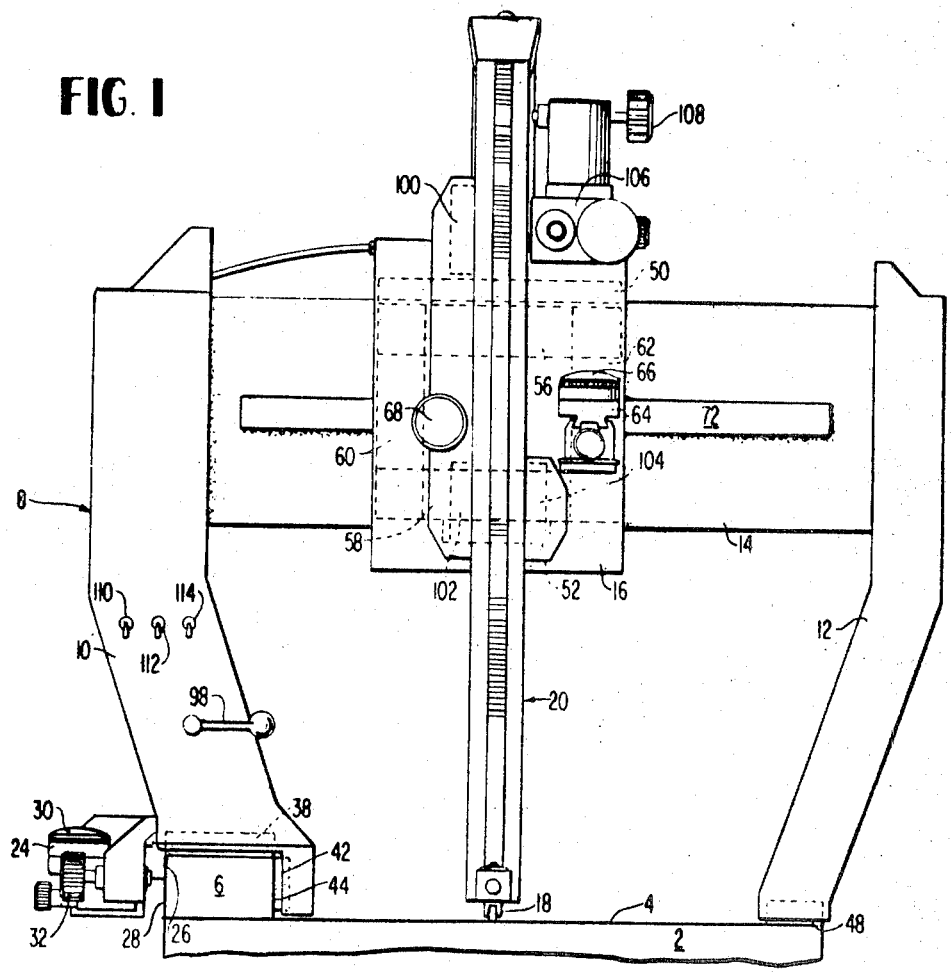
FIG. 1 is a front elevation of a preferred form of apparatus constructed in accordance with the invention.

In FIG. 1, it will be seen that a standard surface plate 2 has an upper planar horizontal surface 4 which forms the base for the coordinate measuring machine of this invention. Such surface plates usually are made of granite, but they may be made of any other dimensionally stable material which is capable of being formed with a substantially flat upper surface.

A probe 18 is movable in any of three mutually perpendicular coordinate directions from any point in the vicinity of the surface plate, thereby permitting measurements along one or more of the three coordinate axes. Many types of probes operating on electrical, mechanical or optical principles may be used. The illustrated probe is one which is brought into contact with various portions of a workpiece supported on the surface 4.

A linear guide bar 6 which may be made of granite is attached to the surface 4 of the surface plate 2. The purpose of the guide bar 6 is to direct a probe supporting pedestal 8 in a linear X axis path across the surface 4.

The disclosed pedestal 8 includes a pair of spaced apart upstanding legs 10 and 12 and a granite beam 14 which extends horizontally betweeen the two legs. A carriage 16 is movable along the beam 14 in a horizontal path perpendicular to the axis of the linear guide member 6. The probe 18 is attached to a vertically movable assembly 20 which is supported from the carriage 16.

Preferably, hydrostatic bearings such as air bearings are used to support and guide the various elements arranged between the surface place 2 and the probe 18. One advantage attributable to such bearings is that they operate well with granite or other stone-like materials which have minute crevices, but which possess the advantage of being formable into highly accurate planar and linear bodies. Another advantage of hydrostatic bearings is that when properly adjusted, they maintain a constant spacing from the surface upon which they act, thus providing an element of repeatability to any measurements derived from such apparatus. A further advantage is that they eliminate abrasion by preventing physical contact between the relatively movable elements. Hydrostatic bearings also permit the braking of the relatively movable elements, simply by shutting off the supply of pressurized fluid to the bearings.

As in all coordinate measuring machines, it is necessary to provide means for indicating the incremental distances traversed by the probe. The disclosed embodiment of the invention uses three gauges of the type sold under the trademark TRAV-A-DIAL by Southwestern Industries, Inc., Los Angeles, California. Such a gauge is disclosed in the manufacturers bulletin SWI 193. These gauges include a rolling contact gauge wheel which is resiliently biased against the reference surface on the adjacent relatively movable body.

In FIG. 1, the gauge 24 has a gauging roller 26 riding against the surface 28 of the guide member 6. The degree of movement between the leg 10 and the member 6 is indicated on the face of the dial 30. Movement between the guide member 6 and the leg 10 of the probe supporting pedestal may be finely adjusted by turning the knob 32 which acts through reduction gearing to positively rotate the gauging roller 26.

Figure 2:
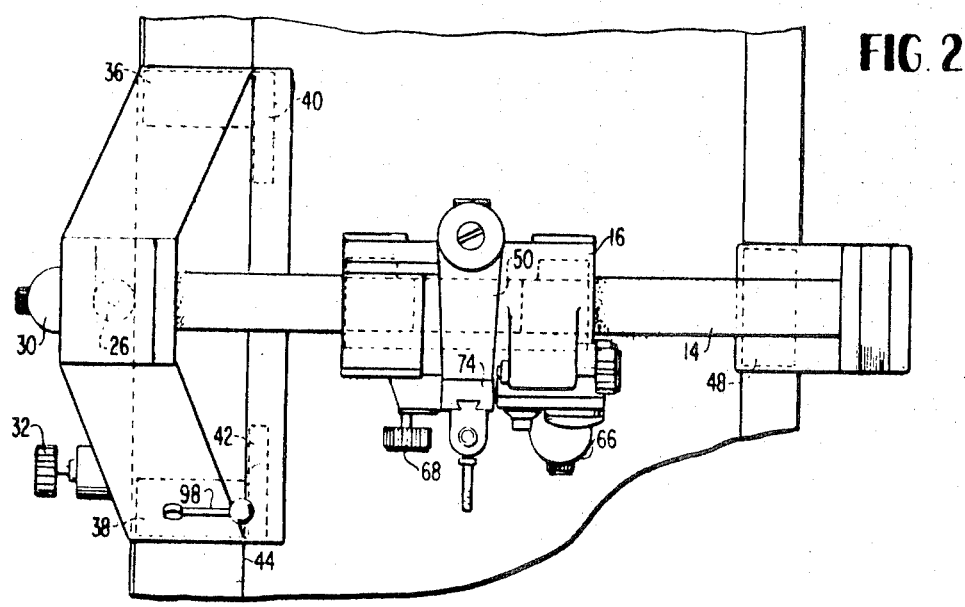
FIG. 2 is a plan view thereof.

The leg 10 of a pedestal 8 is guided and supported on the member 6 by a series of hydrostatic bearings. As shown in FIGS. 1 and 2, there are a pair of such bearings 36 and 38 which ride on the upper surface of the member 6 to support the leg 10. The air bearings 40 and 42 ride on the vertical surface 44 of the guide bar 6 to guide the leg 10 in a linear path.

In order to function properly, hydrostatic bearings must be preloaded so that equilibrium conditions are established between the force generated by fluid emerging from the bearing and a loading force. Horizontally oriented bearings such as 36 and 38 are preloaded by the weight of the structure which they support. On the other hand, bearings such as 40 and 42 which act on vertically oriented surfaces are supporting no weight and therefore must be loaded by some non-gravitational means. In the instant disclosure, this preloading is an incidental but important function of the gauging roller 26, which, as previously mentioned, is resiliently biased against the surface 28 of the guide bar 6. In this fashion, the force delivered by the gauging roller against the guide member 6 preloads the air bearings 40 and 42 so that they may establish equilibrium conditions and accurately guide the leg 10 along the vertical surface 44 of the guide member 6.

The opposite leg 12 of the probe supporting pedestal has a single air bearing 48 which rides on an unobstructed portion of the horizontal surface 4 of the surface plate 2. Of course, the arrangement of the bearings at the lower end of the leg 10 will maintain the entire pedestal in a fixed orientation with respect to the guide member 6 therefore eliminating the need for additional guide means at the lower end of the leg 12.

Hydrostatic bearings are also used to support and guide the carriage 16 for Y axis movement along the granite beam 14. The weight of the carriage 16 is borne by the hydrostatic bearing 50 which rides on the upper horizontal surface of the beam 14. Another air bearing 52 rides on the lower surface of the beam 14. The hydrostatic bearings 56 and 58 are on the carriage 16 and ride along the front surface of beam 14, while the bearings 60 and 62 ride along its rear surface. The purpose of these bearings is, of course, to guide the carriage 16 for movement parallel to the axis to the beam 14.

The position of the carriage 16 on the beam 14 is determined by a gauging device 64 similar to the one previously discussed at 24. The dial 66 indicates the location of the carriage 16. The knob 68 is rotated in order to produce small movements of the carriage. FIG. 1 shows a thin piece of metal 72 attached to the granite beam 14 to provide a suitable surface over which the gauging roller of the gauge 64 may operate.

Figure 3:
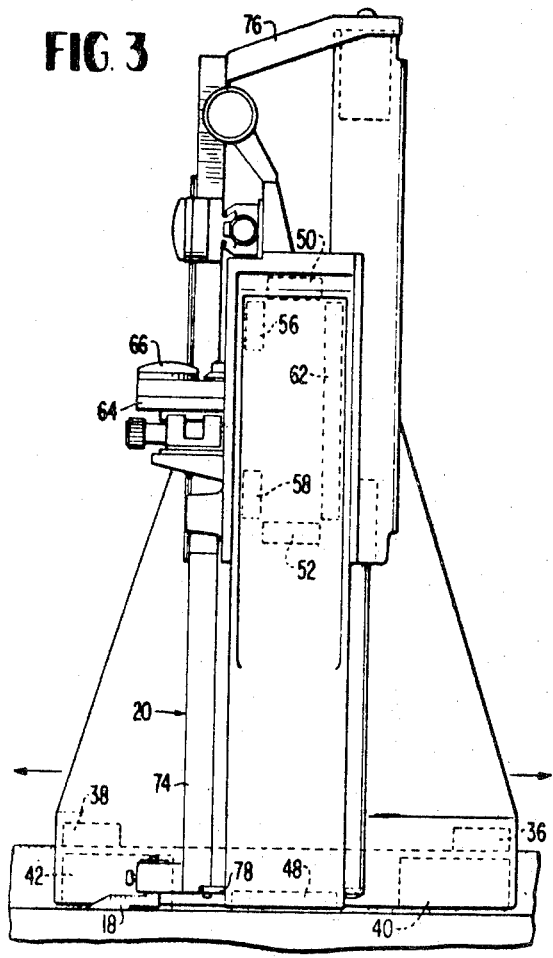
FIG. 3 is a left side elevation of the apparatus of FIG. 1.
Figure 4:
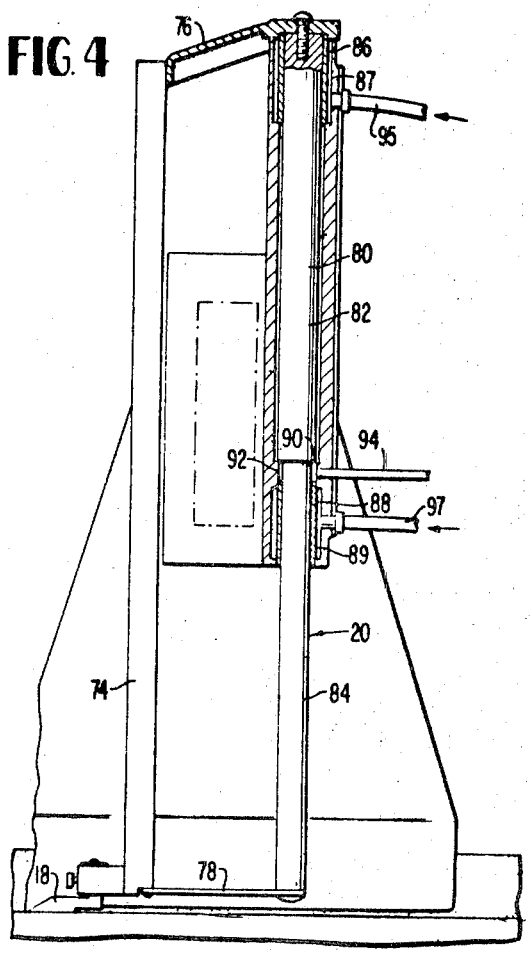
FIG. 4 is a partially sectioned view similar to FIG. 3.
Figure 5:
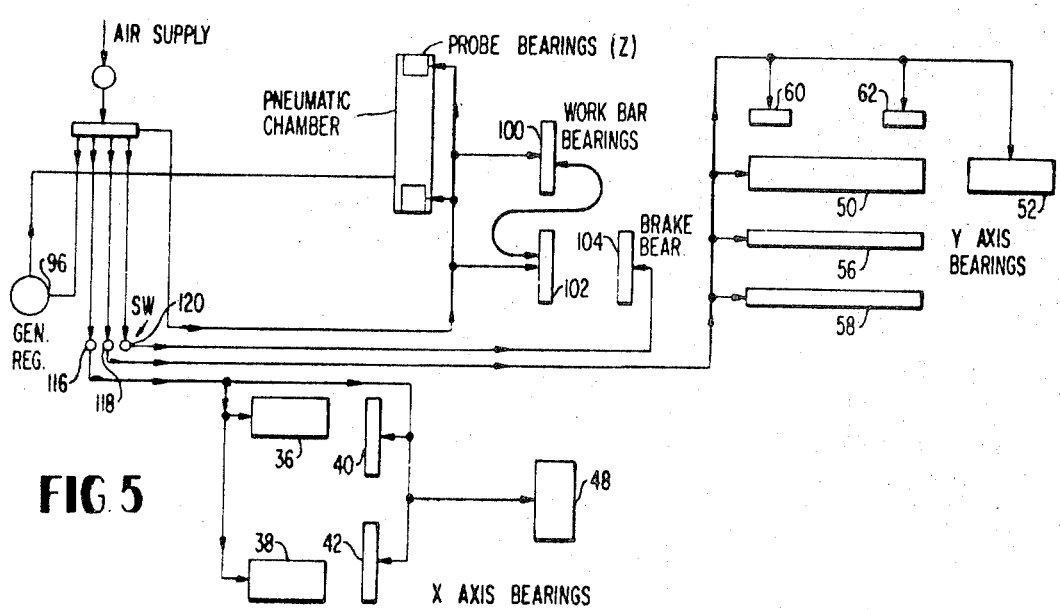
FIG. 5 is a diagrammatic representation of the fluid distribution system for the disclosed apparatus.

Vertical or Z axis movement of the probe is produced by movement of the assembly 20 with respect to the carriage 16. Referring to FIGS. 3 and 4, it will be noted that the assembly 20 includes a vertical work bar element 74 which is connected by end pieces 76 and 78 to a rod 80. The probe 18 is rigidly connected to the work bar 74. Upward forces which tend to counteract the gravitational forces on the assembly 20 are created by the arrangement shown in FIG. 4 where the rod 80 is shown to have an enlarged upper diameter portion 82 and a reduced lower diameter portion 84. A cylindrical hydrostatic bearing 86 guides the upper end 82 of the rod, while the hydrostatic bearing 88 guides the lower end 84 of the rod. The shoulder 90 which lies at the juncture of the portions 82 and 84 of the rod provides a downwardly facing surface at the upper end of the substantially closed chamber 92. With this arrangement, the introduction of air into the chamber 92 will create a force tending to move the rod 80 upwardly. The chamber 92 will normally be maintained under at least a slight pressure by virtue of the air leaking from the bearings 86 and 88. Additionally, there is an air inlet line 94 which communicates with the chamber 92 in order to provide the principal vertical biasing force. Air is supplied to the conduit 94 from a pressure regulator 96 shown schematically in FIG. 5. The control handle 98 for the regulator is shown in FIGS. 1 and 2.

The purpose of this regulator is to control and maintain the pressure within the chamber 92 to affect the magnitude of the upward force.

The work bar 74 has a dovetail groove which receives the base of the probe in the manner illustrated in FIG. 2. The work bar is guided by three air bearings 100, 102 and 104. The air bearing 100 is preloaded by the gauging wheel on the gauge 106 which is identical to the gauge 24. The hydrostatic bearings 102 and 104 operate on opposite sides of the work bar 74 and preload each other. The gauge 106 has the usual fine adjustment knob 108 which, when rotated, will cause the probe supporting assembly to move vertically.

The air bearings include air chambers 87 and 89 which are covered by porous air-diffusing sleeves 86 and 88. Preferably, the sleeves are made of porous copper or bronze which is manufactured by conventional electro-polishing or reverse plating processes. Air to these chambers 87 and 89 is supplied by the flexible conduits 95 and 97. The other air bearings used in this apparatus operate on a similar principle but they have porous bodies with planar surfaces. Preferably, these air bearings include a housing which provides an air chamber at the rear face of the porous body, and the housings are universally mounted so that the flat face of the porous surface may assume a position parallel to the surface upon which it rides.

Under some circumstances, it is desirable to connect a probe directly to the cylindrical rod 80. For example, when the probe is to swing in an arcuate path in horizontal planes, the probe is attached to the rod 80 which is then rotatably connected to the members 76 and 78.

During the course of measuring or laying out a workpiece with the apparatus of this invention, it is often desirable to immobilize the probe to prevent its movement along one or more of its coordinate axes. The disclosed apparatus is easily given such a capability by providing valves which shut off the air leading to selected bearings. The actuating levers for these valves are shown at 110, 112 and 114 in FIG. 1 where they are located on the leg 10. The valves themselves are shown at 116, 118 and 120 in the diagrammatic illustration of the air supply in FIG. 5. There, it will be seen that by closing the valves 116 the air leading from the supply manifold will be cut off from the bearings 36, 38 40, 42 and 48 which normally permit the probe to move in a direction along the X-axis. In a like manner, the closing of the valve 118 will prevent the Y-axis movement of the carriage 16 along the beam 14 as the bearings 50, 52, 56, 58, 60 and 62 are disabled.

Z-axis movement cannot be arrested by simply shutting off the air supply to the appropriate bearings, since the influence of gravity on the probe supporting assembly 20 would allow the probe to fall to its lowermost position. In order to avoid this, the assembly 20 is frictionally restrained from gravitational movement simply by deactivating only one of a pair of bearings which act upon opposite sides of the assembly 20. Applying this to the present disclosure, the switch 120 is used to cut off the air supply to the brake bearing 104. When this is done, the work bar 74 moves a slight distance under the influence of forces generated by the continuously activated bearing 102 until it frictionally engages a stationary surface which may be the deactivated bearing 104. Since the probe supporting assembly 20 has a relatively small or negative effective weight due to the pneumatic counterbalancing arrangement explained previously, this frictional force is sufficient to lock it in a fixed position.

This specification has dealt with only one possible embodiment which incorporates several important features of the invention. It is appreciated that others in the art may devise machines of this type which differ substantially in many respects. Accordingly this invention is not limited to the sole embodiment described above, but encompasses those modifications, substitutions and improvements which fall within the scope of the claims which follow.

I claim:

1. Coordinate measuring apparatus comprising a planar surface, a probe supporting member movable parallel to the planar surface, and a probe supported on the probe supporting member by a pair of interfitting telescopic members, one of said telescopic members being attached to the probe and the other of said telescopic members being attached to the carriage, a substantially closed chamber formed between the telescopic members, said one telescopic member having a downwardly facing area within the chamber which exceeds its upwardly facing area if any within the chamber, means for controlling the pressure within the chamber thereby to control the upward force exerted on the one telescopic member by fluid in the chamber, said probe being directly connected to an element which is parallel to and laterally spaced from the one telescopic member, means connecting the element and the one telescopic member, hydrostatic bearings for maintaining the axis of said element in a fixed orientation, said hydrostatic bearings being operable upon opposite sides of said element, and means for deactivating the bearing means on only one side of said element, thereby effecting a frictional braking action on the one side of the element.

2. Measuring apparatus comprising a vertically movable element, a probe connected to and movable with said element, hydrostatic bearing means acting against opposite sides of the element to guide the element for vertical linear movement, and means for deactivating the bearing means on only one side of said element, thereby producing a frictional braking action against the one side of the element.

* * * * *